United States Patent [19]

Cordova

[11] Patent Number: 5,668,908
[45] Date of Patent: Sep. 16, 1997

[54] FIBER OPTIC GYRO SENSOR COIL WITH IMPROVED TEMPERATURE STABILITY

[75] Inventor: Amado Cordova, West Hills, Calif.

[73] Assignee: Litton Systems, Inc., Woodland Hills, Calif.

[21] Appl. No.: 577,432

[22] Filed: Dec. 22, 1995

[51] Int. Cl.$^6$ .................................................. G02B 6/02
[52] U.S. Cl. ........................................ 385/128; 356/326
[58] Field of Search ................................ 356/326, 350; 385/12, 13, 100, 114, 115, 121, 134, 147, 85, 128

[56] References Cited

U.S. PATENT DOCUMENTS

| | | | |
|---|---|---|---|
| 4,426,889 | 1/1984 | Schluntz et al. | 74/5 R |
| 5,371,593 | 12/1994 | Cordova et al. | 356/350 |
| 5,444,534 | 8/1995 | Dyott et al. | 356/350 |
| 5,481,358 | 1/1996 | Dyott et al. | 356/350 |
| 5,546,482 | 8/1996 | Cordova et al. | 385/100 |
| 5,552,887 | 9/1996 | Dyott | 356/350 |

*Primary Examiner*—Akm E. Ullah
*Attorney, Agent, or Firm*—Robert E. Malm

[57] ABSTRACT

A fiber optic gyro sensor coil with improved temperature stability for use at temperatures between T1 and T2, T1 being less than −30° C. and T2 being greater than 60° C. The coil is wound with an optical fiber having one or more jackets. The one or more jackets are made of materials having glass transition regions outside the temperature range from T1 to T2.

12 Claims, 2 Drawing Sheets

FIBER OPTIC GYRO SENSOR COIL WITH IMPROVED TEMPERATURE STABILITY

BACKGROUND OF THE INVENTION

This invention relates generally to fiber optic gyros and more specifically to fiber optic gyro sensor coils and the optical fiber with which they are wound.

Fiber optic gyros sense rotation by measuring the phase difference in light waves that propagate in opposite directions through a coil wound with optical fiber. Light waves that propagate through the coil in the direction of rotation take a longer time than light waves that propagate through the coil in the direction opposite to the direction of rotation. This difference in time, measured as the phase difference between counter propagating light waves, is proportional to the angular velocity of the coil.

The phase difference between counter propagating light waves in a fiber optic gyro sensor coil is affected not only by the angular velocity of the coil but also by changes in the physical properties of the coil brought about by changes in environmental parameters, temperature being the most important. A change in temperature of the coil changes the index of refraction and the physical dimensions of the optical fiber thereby directly affecting the time it takes for a light wave to propagate through the coil.

If the rate of change of temperature were low enough that the coil had substantially the same temperature throughout its volume, the changes in propagation times of the counter propagating waves would be substantially the same and the measured phase difference would be substantially independent of the rate of change of temperature. However, at rates of change of temperature that fiber optic gyros encounter, the counter propagating waves experience different temperatures at a given time and complete cancellation of the temperature effects do not occur. As a result the phase difference as measured by a fiber optic gyro includes a bias which must be subtracted from the measured phase difference to obtain the phase difference attributable to the rotation of the coil.

It is possible to accurately model the bias of coils designed for high-accuracy applications with a function of temperature (the "modeling function") which is related to thermally-induced nonreciprocities. (See D. M Shupe, *Thermally Induced Non-Reciprocity in the Fiber Optic Interferometer*, 19 Applied Physics 654 (1980). See also U.S. Pat. No. 5,371,593, *Sensor Coil for Low-Bias Fiber Optic Gyroscope*, A. Cordova et al.) In order to further improve the accuracy of these gyros, it is very important to eliminate, or at least to reduce substantially, the temperature dependence of the coefficients that define the modeling function.

SUMMARY OF THE INVENTION

A fiber optic gyro sensor coil with improved temperature stability for use at temperatures between T1 and T2, T1 being less than −30° C. and T2 being greater than 60° C. The coil is wound with an optical fiber having one or more jackets. The one or more jackets are made of materials having glass transition regions outside the temperature range from T1 to T2.

DESCRIPTION OF THE PREFERRED EMBODIMENTS

Figure 1:
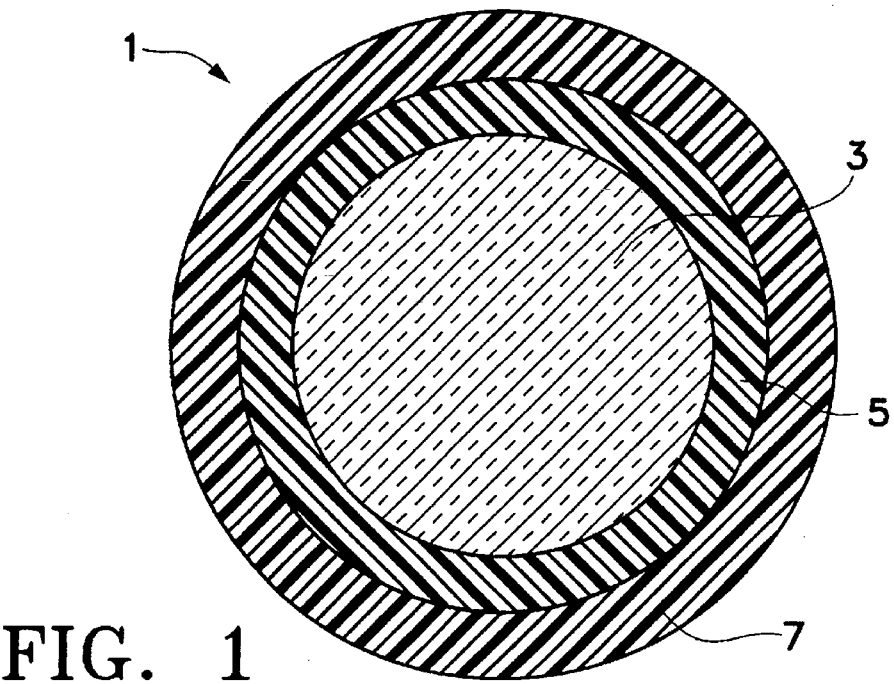
FIG. 1 shows the cross section of an optical fiber for use in winding the sensor coil for a fiber optic gyro.

One reason for the strong temperature dependence of the modeling function coefficients is the large variation over temperature of the physical properties of the jacket of the optical fiber in the coil. FIG. 1 shows the cross section of a typical optical fiber 1 used in winding fiber optic gyro sensor coils. The optical fiber 1 has an optical core-and-cladding 3, an inner jacket 5 and an outer jacket 7. The typical inner jacket material is a silicone, and the typical outer jacket material is an acrylate. The core and cladding are typically made of glass. Alternative embodiments of the invention may use optical fibers having a single jacket. The fiber can be "single-mode" (low-birefringence) or "polarization maintaining".

Theoretical calculations predict sharp changes in the modeling function coefficients for coils wound with optical fibers having conventional jackets, at each end of a temperature range, due to the large variation in the modulus of elasticity of the inner silicone jacket material at low temperatures and the large variation in the modulus of the outer acrylate jacket material at high temperatures.

Figure 2:
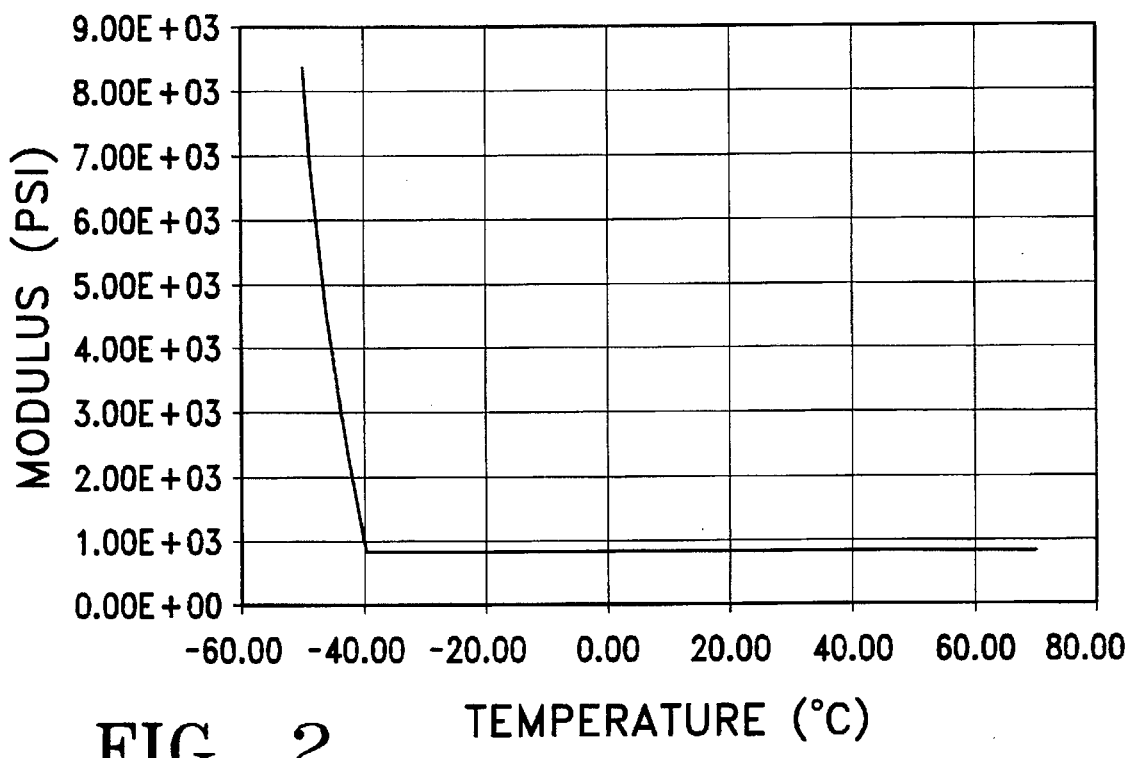
FIG. 2 shows the modulus of elasticity as a function of temperature for a typical silicone used as the inner jacket material of jacketed optical fibers having inner and outer jackets.
Figure 3:
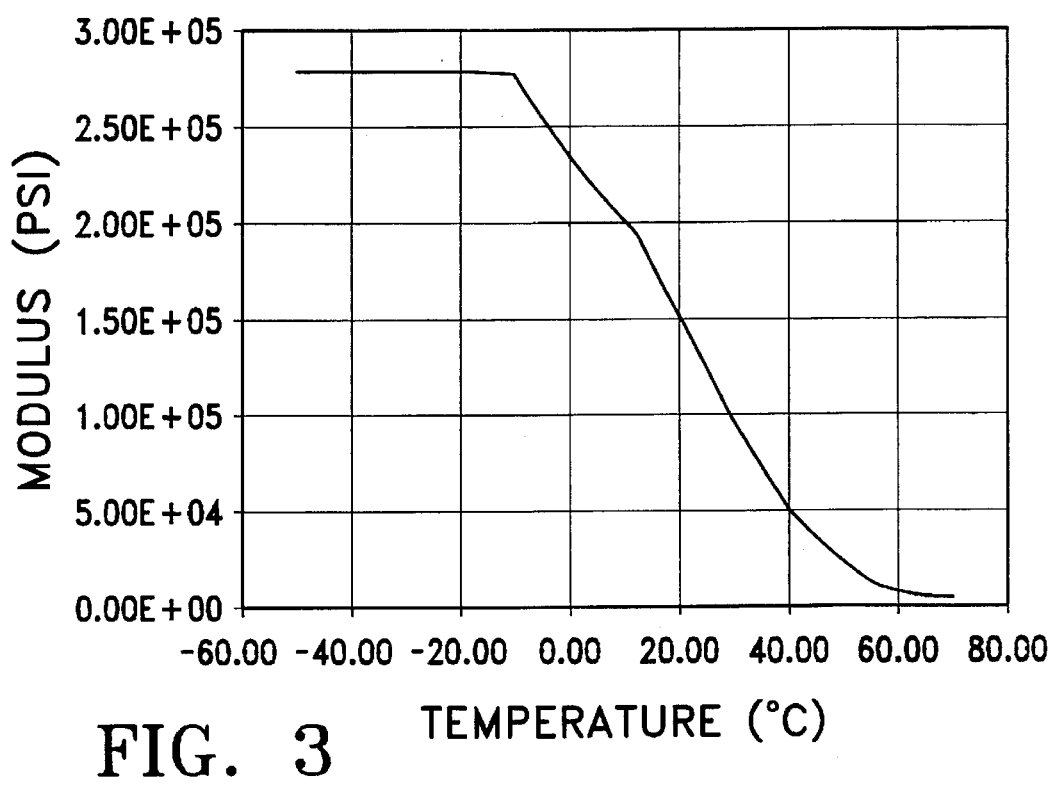
FIG. 3 shows the modulus of elasticity as a function of temperature for a typical acrylate used as the outer jacket material of jacketed optical fibers having inner and outer jackets.

The modulus of elasticity as a function of temperature for the inner silicone jacket material of a fiber with a conventional jacket is shown in FIG. 2. The modulus is nearly constant for temperatures above about −30° C. The modulus of elasticity as a function of temperature for the outer acrylate jacket material of a fiber with a conventional jacket is shown in FIG. 3. The modulus is nearly constant for temperatures up to about −10° C. and then decreases to a very low value over the temperature range from about −10° C. to about 60° C. The modulus plots shown in FIGS. 2 and 3 have a linear vertical scale. If the plots were to have a logarithmic scale, they would clearly show a dramatic drop in the modulus which can be about two orders of magnitude.

Figure 4:
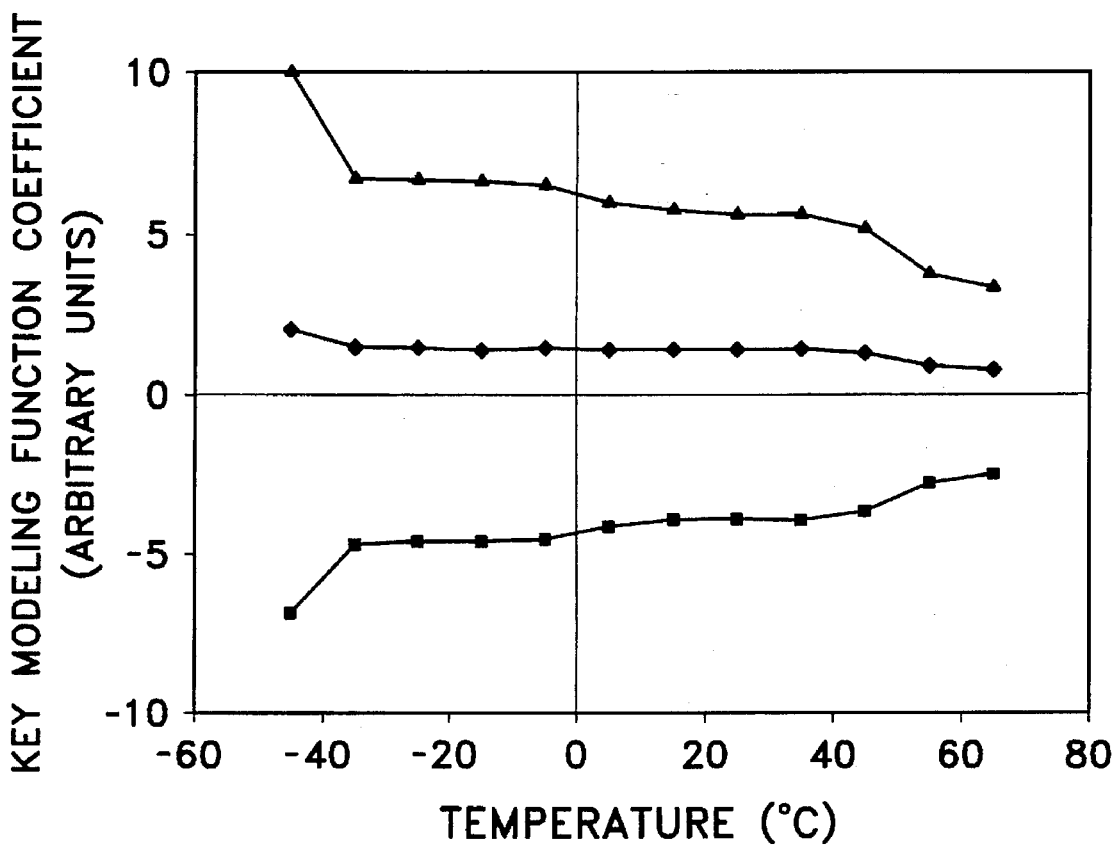
FIG. 4 shows the key modeling function coefficient as a function of temperature for three different coil configurations.

The key modeling function coefficient as a function of temperature is shown in FIG. 4 for three coil configurations.

A comparison of the modulus curves with the modeling-function-coefficient curves reveals the connection between changes in the modulus of elasticity for the inner and outer jackets and the changes in the key modeling function coefficient for a coil wound with an optical fiber having conventional jackets. The substantial change in the key modeling function coefficient at low temperatures corresponds to the rapid change in the modulus of the inner jacket material (FIG. 2). The more gradual change in the key modeling function coefficient at the higher temperatures corresponds to the more gradual change in the modulus of the outer jacket material (FIG. 3).

The temperature range over which the modulus of a jacket material changes from a high to a low value is referred to as the "glass transition region". The median of this temperature range is referred to as the "glass transition temperature". At temperatures below the glass transition region, the jacket material is hard or "glass-like". At temperatures above the glass transition region, the jacket material is soft or "rubber-like". The low end of the glass transition region is defined to be the temperature at which the modulus is one-third the high glassy-state value. The high end of the glass transition region is defined to be the temperature at which the modulus is three times the low rubbery-state value. A jacket material can have several glass transition regions.

Ideally, the modulus of elasticity of all jacket materials should be approximately constant over the gyro's operating temperature range. Therefore, the glass transition regions of all jacket materials should be outside the operating temperature range. Materials suitable for jacket materials and having glass transition regions both above and below the operating ranges of gyros are well known in the art.

What is claimed is:

1. A fiber optic gyro coil for use at temperatures between T1 and T2, T1 being less than −30° C. and T2 being greater than 60° C., the coil being wound with single-mode or single-mode polarization-maintaining optical fiber having one or more jackets, the one or more jackets being made of materials with glass transition regions outside the temperature range from T1 to T2.

2. The fiber optic gyro coil of claim 1 wherein T2 is greater than 70° C.

3. The fiber optic gyro coil of claim 1 wherein T2 is greater than 90° C.

4. The fiber optic gyro coil of claim 1 wherein T2 is greater than 100° C.

5. The fiber optic gyro coil of claim 1 wherein T1 is less than −45° C.

6. The fiber optic gyro coil of claim 1 wherein T1 is less than −45° C. and T2 is greater than 70° C.

7. The fiber optic gyro coil of claim 1 wherein T1 is less than −45° C. and T2 is greater than 90° C.

8. The fiber optic gyro coil of claim 1 whereto T1 is less than −45° C. and T2 is greater than 100° C.

9. The fiber optic gyro coil of claim 1 wherein T1 is less than −55° C.

10. The fiber optic gyro coil of claim 1 wherein T1 is less than −55° C. and T2 is greater than 70° C.

11. The fiber optic gyro coil of claim 1 wherein T1 is less than −55° C. and T2 is greater than 90° C.

12. The fiber optic gyro coil of claim 1 wherein T1 is less than −55° C. and T2 is greater than 100° C.

* * * * *